United States Patent Office 3,499,085
Patented Mar. 3, 1970

3,499,085
FUNGICIDAL 1-ACYL-BENZIMIDAZOLINE
COMPOSITIONS AND METHODS OF USE
Klaus Sasse, Cologne-Stammheim, and Ferdinand Grewe, Burscheid, Germany, assignors to Farbenfabriken Bayer Aktiengesellschaft, Leverkusen, Germany, a corporation of Germany
No Drawing. Filed Sept. 27, 1967, Ser. No. 671,112
Claims priority, application Germany, Oct. 4, 1966, F 50,354
Int. Cl. A01n 9/22; C07d 49/38
U.S. Cl. 424—273                                30 Claims

ABSTRACT OF THE DISCLOSURE

Fungicidal compositions of and methods of combatting fungi using certain 1-acyl-benzimidazolines, some of which are known, which possess fungicidal properties and which may be produced by conventional methods.

---

The present invention relates to and has for its objects the provision for fungicidal compositions of certain 1-acyl-benzimidazolines, some of which are known, and which possess fungicidal properties, in the form of mixtures of such compounds with solid dispersible carrier vehicles or with liquid dispersible carrier vehicles containing a surface-active agent, and methods for using such compounds in a new way especially for combatting fungi, with other and further objects becoming apparent from a study of the within specification and accompanying examples.

It is known that N-trichloromethylthio-tetrahydrophthalimide (A) can be used for the control of phytopathogenic fungi. This active compound has gained an extraordinarily great importance in practice.

It has been found in accordance with the present invention that certain 1-acyl-benzimidazolines, some of which are known, having the formula

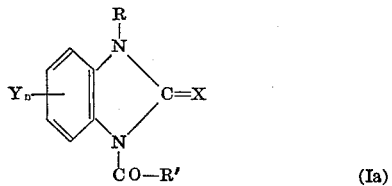

(Ia)

in which R is selected from the group consisting of hydrogen, alkyl having 1–12 carbon atoms, alkenyl having 2–6 carbon atoms, lower alkoxy lower alkyl, lower alkylmercapto lower alkyl, phenyl lower alkyl, cycloalkyl having 5–8 ring carbon atoms, and lower alkanoyl, R' is selected from the group consisting of hydrogen, alkyl having 1–17 carbon atoms, alkenyl having 2–4 carbon atoms, alkynyl having 2–4 carbon atoms, halo lower alkyl, lower alkoxy, lower alkyl, $C_{1-12}$ alkylmercapto lower alkyl, phenyl lower alkylmercapto lower alkyl, phenoxy lower alkyl, phenylmercapto lower alkyl, heterocyclic lower alkyl having 5–6 ring members and a hetero atom selected from the group consisting of N, O and S in the corresponding heterocyclic moiety, phenyl lower alkyl, substituted phenyl lower alkyl in which the phenyl moiety is substituted with 1–2 substituents selected from the group consisting of halo, $C_{1-4}$ alkyl, nitro, $C_{1-4}$ alkoxy, cyano, and mixtures of such substituents, phenyl $C_{2-4}$ alkenyl, heterocyclic $C_{2-4}$ alkenyl having 5–6 ring members and a hetero atom selected from the group consisting of N, O and S in the corresponding heterocyclic moiety, and cycloalkyl having 3–6 carbon atoms, X is selected from the group consisting of sulfur and oxygen, each Y respectively is selected from the group consisting of halo, $C_{1-4}$ alkyl, $C_{1-4}$ alkoxy, $C_{1-4}$ alkylmercapto, halo $C_{1-4}$ alkyl having 1–3 halo substituents, and nitro, and $n$ is a number from 0 to 4, exhibit strong fungicidal properties.

It is very surprising that such benzimidazolines which are usable according to the present invention have a considerably higher fungicidal activity than N-trichloromethylthio-tetrahydrophthalimide (A) which is known from the prior art. The fungicidal compositions and methods of combatting fungi using such active compounds according to the present invention therefore represent a valuable enrichment of the art.

Of the 1-acyl-benzimidazoline compounds which can be used according to the present invention, only 1-acetyl-2-thionobenzimidazoline (IIa) [J. Ind. Chem. Soc. 6, 193, and Austr. J. Chem., 15, 792 (1962)] and 1-acetyl-3-methyl-2-thiono-benzimidazoline (IIIa) [J. Chem. Soc., 1956, 361] are already known.

These two compounds may be prepared by the action of acetic anhydride on 2-mercapto-benzimidazole or on 1-methyl-2-mercapto-benzimidazole.

The question of whether the acylation products of 2-mercapto-benzimidazoles possess the structure (I'a) or the structure (I'b)

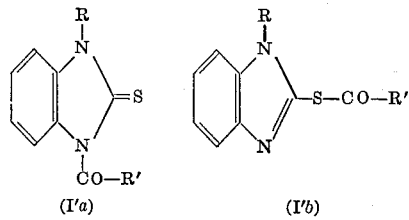

(I'a)                    (I'b)

(cf. German Patent 961,169) would, according to spectroscopic investigations, probably be decided in favor of the structure (I'a) stated in the literature, although it will be realized that nothing herein is to be construed as limiting the invention in question to any particular theory as to the type structure of the compounds in question.

The present invention also provides certain new 1-acyl-benzimidazolines of general Formula Ia in which it is not the case that, simultaneously, R is hydrogen, R' is methyl, X is sulfur and $n$ is 0, and in which it is not the case that, simultaneously, R is methyl, R' is methyl, X is sulfur and $n$ is 0.

These benzimidazolines can be prepared in the same manner as the aforesaid known benzimidazolines, but they can also be prepared by other usual acylating methods involving acylation of appropriate 2-mercapto-benzimidazoles or 2-hydroxybenzimidazoles.

For the preparation of such certain new compounds by acylation, three processes are particularly suitable.

In the first process, 2-hydroxy-benzimidazole or 2-mercapto-benzimidazole is reacted with the appropriate carboxylic anhydride, optionally in the presence of a solvent, at elevated temperatures, preferably by boiling under reflux.

In the second process, 2-hydroxy-benzimidazole or 2-mercapto-benzimidazole is reacted with the appropriate acid chloride. This reaction can be carried out without further additives in an inert organic solvent at temperatures between 40 and 200° C. However, the reaction can also be carried out in the presence of an acid-binding agent, such as potassium carbonate or tertiary amines, for example trimethylamine or pyridine. In the latter case, the reaction is performed at lower temperatures, for example between about −10 and +40° C. Finally, it is also possible to react an alkali metal salt of the corresponding hydroxy-benzimidazole or of the corresponding mercapto-benzimidazole with the appropriate acid chlorides.

For the reaction with acid chlorides, all organic diluents are suitable which do not themselves react with acid halides, for example aromatic hydrocarbons, such as benzene and toluene, chlorinated hydrocarbons such as chlorobenzene and tetrachloroethane, ethers, such as dioxan and tetrahydrofuran, and also ketones and carboxylic acid esters, and the like.

In the third process, the appropriate carboxylic acid is reacted directly with the 2-hydroxy-benzimidazole or 2-mercapto-benzimidazole. Here it is expedient to carry out the reaction at elevated temperatures in the presence of a solvent and continuously to distill off as an azeotropic mixture the water which is formed.

The 2-hydroxy-benzimidazoles and 2-mercapto-benzimidazoles required as starting materials are, in part, known. Those which are not yet known can be prepared in the same manner as those which are known.

Thus, it is possible for example to react 2-chloronitrobenzenes with ammonia and/or a primary amine and to reduce the 2-amino-nitrobenzene which is formed to give 1,2-diaminobenzene. If it is desired to prepare 2-hydroxy-benzimidazoles, the 1,2-diaminobenzene is reacted with phosgene or with a chloroformic acid ester. If it is desired to prepare 2-mercapto-benzimidazoles, the 1,2-diaminobenzenes are reacted with carbon disulfide, thiophosgene or alkali metal xanthates.

As examples of the 1-acyl-benzimidazoline substances which can be used according to the instant invention, the following may be mentioned in particular:

($IV_1$) 1-formyl-3-methyl-2-thiono-benzimidazoline
($IIa_1$) 1-acetyl-2-thiono-benzimidazoline
($IIIa_1$) 1-acetyl-3-methyl-2-thiono-benzimidazoline
($V_1$) 1-acetyl-3-isopropyl-2-thiono-benzimidazoline
($VI_1$) 1-acetyl-3-dodecyl-2-thiono-benzimidazoline
($VII_1$) 1-acetyl-3-allyl-2-thiono-benzimidazoline
($VIII_1$) 1-acetyl-3-(3'-methoxy-propyl)-2-thiono-benzimidazoline
($IX_1$) 1-acetyl-3-(2'-methylmercapto-ethyl)-2-thiono-benzimidazoline
($X_1$) 1-acetyl-3-cyclopentyl-2-thiono-benzimidazoline
($XI_1$) 1-acetyl-3-cyclohexyl-2-thiono-benzimidazoline
($XII_1$) 1-acetyl-3-cyclooctyl-2-thiono-benzimidazoline
($XIII_1$) 1-acetyl-2-oxo-benzimidazoline
($XIV_1$) 1-acetyl-3-methyl-2-oxo-benzimidazoline
($XV_1$) 1,3-diacetyl-2-oxo-benzimidazoline
($XVI_1$) 1-acetyl-3-methyl-4-chloro-2-thiono-benzimidazoline
($XVII_1$) 1-acetyl-3-methyl-6-chloro-2-thiono-benzimidazoline
($XVIII_1$) 1-acetyl-3-methyl-4,6-dichloro-2-thiono-benzimidazoline
($XIX_1$) 1-acetyl-3-methyl-6-bromo-2-thiono-benzimidazoline
($XX_1$) 1-acetyl-3-methyl-6-fluoro-2-thiono-benzimidazoline
($XXI_1$) 1-acetyl-3-methyl-6-nitro-2-thiono-benzimidazoline
($XXII_1$) 1-acetyl-3,6-dimethyl-2-thiono-benzimidazoline
($XXIII_1$) 1-acetyl-3-methyl-6-isopropyl-2-thiono-benzimidazoline
($XXIV_1$) 1-acetyl-3,6-dimethyl-4-chloro-2-thiono-benzimidazoline
($XXV_1$) 1-acetyl-3-methyl-6-trifluoromethyl-2-thiono-benzimidazoline
($XXVI_1$) 1-acetyl-3-methyl-6-methoxy-2-thiono-benzimidazoline
($XXVII_1$) 1-acetyl-3-methyl-6-butoxy-2-thiono-benzimidazoline
($XXVIII_1$) 1-acetyl-3-methyl-6-methylmercapto-2-thiono-benzimidazoline
($XXIX_1$) 1-propionyl-3-methyl-2-thiono-benzimidazoline
($XXX_1$) 1-butyryl-3-methyl-2-thiono-benzimidazoline
($XXXI_1$) 1-isobutyryl-3-methyl-2-thiono-benzimidazoline
($XXXII_1$) 1-stearoyl-3-methyl-2-thiono-benzimidazoline
($XXXIII_1$) 1-methacroyl-3-methyl-2-thiono-benzimidazoline
($XXXIV_1$) 1-crotonyl-3-methyl-2-thiono-benzimidazoline
($XXXV_1$) 1-propiolyl-3-methyl-2-thiono-benzimidazoline
($XXXVI_1$) 1-trichloroacetyl-3-methyl-2-thiono-benzimidazoline
($XXXVII_1$) 1-trifluoroacetyl-3-methyl-2-thiono-benzimidazoline
($XXXVIII_1$) 1-ethoxyacetyl-3-methyl-2-thiono-benzimidazoline
($XXXIX_1$) 1-methylmercapto-acetyl-3-methyl-2-thiono-benzimidazoline
($XL_1$) 1-dodecylmercapto-acetyl-3-methyl-2-thiono-benzimidazoline
($XLI_1$) 1-phenoxyacetyl-3-methyl-2-thiono-benzimidazoline
($XLII_1$) 1-phenylmercapto-acetyl-3-methyl-2-thiono-benzimidazoline
($XLIII_1$) 1-benzylmercaptoacetyl-3-methyl-2-thiono-benzimidazoline
($XLIV_1$) 1-phenylacetyl-3-methyl-2-thiono-benzimidazoline
($XLV_1$) 1-cinnamoyl-3-methyl-2-thiono-benzimidazoline
($XLVI_1$) 1-(4'-chloro-phenyl)-acetyl-3-methyl-2-thiono-benzimidazoline
($XLVII_1$) 1-(4'-methyl-phenyl)-acetyl-3-methyl-2-thiono-benzimidazoline
($XLVIII_1$) 1-(3'-chloro-4-methoxy-phenyl)-acetyl-3-methyl-2-thiono-benzimidazoline
($IL_1$) 1-(4'-nitro-phenyl)-acetyl-3-methyl-2-thiono-benzimidazoline
($L_1$) 1-(4'-cyano-phenyl)-acetyl-3-methyl-2-thiono-benzimidazoline
($LI_1$) 1-(2'-furyl-acroyl)-3-methyl-2-thiono-benzimidazoline
($LII_1$) 1-thienyl-acetyl-3-methyl-2-thiono-benzimidazoline
($LIII_1$) 1-cyclopropanoyl-3-methyl-2-thiono-benzimidazoline
($LIV_1$) 1-cyclohexanoyl-3-methyl-2-thiono-benzimidazoline Advantageously, the 1-acyl-benzimidazolines contemplated by the present invention exhibit strong fungitoxic properties and, by reason of their very good plant compatability, are particularly suitable for the control of phytopathogenic fungi.

Thus, the instant compounds are effective for example against fungi of the genera Phytophthora, Alternaria, Plasmopara, Pseudoperonospora, Sphaerotheca and Oidium; and the like. The benzimidazolines contemplated herein have a particularly good activity against non-powdery mildew fungi. Surprisingly, they are effective not only protectively but also curatively. When plants are treated against non-powdery mildew fungi with the instant active compounds, infestation by powdery mildew fungi may be repressed to such an extent that no economic damage arises.

The instant active compounds have given particularly good results for the control of apple scab (*Venturia inaequalis* [*Fusicladium dentriticum*]) and powdery mildew of apple (*Podosphaera leucotricha*); and the like.

The particular active compounds to be used according to the instant invention can be utilized, if desired, in the form of the usual formulations or compositions with diluents or extenders, i.e., dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1969, pp. 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hdyrocarbons (for instance, methylene chloride, etc.), alcohols (for instance, methanol, ethanol, propanol, butanol, etc.), amines (for instance, ethanolamine, etc.), ethers, ether-alcohols (for instance, glycol monomethyl ether, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be employed alone or in the form of mixtures with one another and/or with such solid or liquid dispersible carrier vehicles and/or with other known compatible active agents, especially plant protection agents, such as other fungicides, herbicides, insecticides, acaricides, bactericides, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.0001–1.0%, preferably 0.001–0.2%, by weight of the mixture. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.001–95%, and preferably 0.001–95% by weight of the mixture.

Furthermore, the present invention contemplates methods of selectively controlling or combatting fungi, which comprises applying to at least one of (a) such fungi and (b) their habitat, i.e., the locus to be protected, a fungicidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The fungicidal activity of such active compounds usable according to the present invention is illustrated, without limitation, by the following examples. In the tables of these examples, the numbered compounds correspond to those identified correspondingly by the same numbers in Examples 4 to 6 and with table of compounds following Example 6.

EXAMPLE 1

Fusicladium test (apple scab) [protective]

Solvent: 4.7 parts by weight acetone.
Emulsifier: 0.3 part by weight alkylaryl polyglycol ether.
Water: 95.0 parts by weight.

The amount of the particular active compound required for the desired concentration of such active compound in the spray liquid to be used is mixed with the stated amount of solvent, and the concentrate is diluted with the stated amount of water which contains the stated emulsifier.

Young apple seedlings in the 4–6 leaf stage are sprayed with such spray liquid until dripping wet. The plants remain in a greenhouse for 24 hours at 20° C. and at a relative atmospheric humidity of 70%. Such plants are then inoculated with an aqueous conidium suspension of the apple scab causative organism (*Fusicladium dendriticum* Fuck.) and incubated for 18 hours in a humidity chamber at 18–20° C. and at a relative atmospheric humidity of 100%.

The plants are then again placed in a greenhouse for 14 days.

15 days after inoculation, the infestation of the seedlings is determined as a percentage of the untreated but also inoculated control plants.

0% means no infestation; 100% means that the infestation is exactly as great as in the case of the control plants.

The particular active compounds, the concentrations of such active compounds and the results obtained can be seen from the following Table 1:

TABLE 1.—FUSICLADIUM TEST [PROTECTIVE]

| Active compound | Infestation as a percentage of the infestation of the untreated control with a concentration of active compound (in percent) of— | | |
|---|---|---|---|
| | 0.025 | 0.0062 | 0.0031 |
| (A) N-trichloromethylthio-tetrahydrophthalimide (known) | 9 | 18 | 34 |
| (III$a_2$) | | 0 | 0 |
| (LV$_1$) | | 6 | 25 |
| (LVI$_1$) | | 10 | |
| (XXIX$_2$) | | 0 | 13 |
| (XXX$_2$) | | 0 | 2 |
| (XVII$_2$) | | 0 | 0 |
| (LXIV$_1$) | | 0 | 5 |
| (XXII$_2$) | | 2 | 2 |
| (LXV$_1$) | | 0 | 0 |
| (LXVI$_1$) | | 0 | 4 |
| (XXV$_2$) | | 0 | 2 |
| (LXVII$_1$) | | 0 | 0 |

EXAMPLE 2

Fusicladium test (apple scab) [curative]

Solvent: 4.7 parts by weight acetone.
Emulsifier: 0.3 part by weight alkylaryl polyglycol ether.
Water: 95.0 parts by weight.

The amount of the particular active compound required for the desired concentration of such active compound in the spray liquid to be used is mixed with the stated amount of solvent, and the concentrate is diluted with the stated amount of water which contains the stated emulsifier.

Young apple seedlings in the 4–6 leaf stage are inoculated with an aqueous conidium suspension of the apple scab causative organism (*Fusicladium dendriticum* Fuck.) and incubated for 18 hours in a humidity chamber at 18–20° C. and at an atmospheric humidity of 100%. The plants are then placed in a greenhouse where they dry.

After standing for a suitable period of time, the plants are sprayed dripping wet with the spray liquid prepared in the manner described above. The plants are then again placed in a greenhouse.

15 days after inoculation, the infestation of the apple seedlings is determined as a percentage of the untreated but also inoculated control plants.

0% means no infestation; 100% means that the infestation is exactly as great as in the case of the control plants.

The particular active compounds, the concentration of such active compounds, the period of time between inoculation and spraying, and the results obtained can be seen from the following Table 2:

TABLE 2.—FUSICLADIUM TEST (CURATIVE)

| Active compound [1] | Infestation as a percentage of the infestation of the untreated control with a concentration of active compound in percent of 0.1 |
|---|---|
| (A) N-trichloromethylthio-tetrahydrophthalimide (known) | 100 |
| (III$a_3$) | 21 |
| (II$a_2$) | 3 |
| (LV$_2$) | 81 |
| (LVI$_3$) | 64 |
| (XXIX$_3$) | 25 |
| (XXX$_3$) | 13 |
| (XXXIII$_2$) | 64 |
| (XVII$_3$) | 40 |
| (LXIV$_2$) | 45 |
| (XXII$_3$) | 30 |
| (LXV$_2$) | 35 |
| (LXVI$_2$) | 62 |
| (XXV$_3$) | 27 |
| (LXVII$_2$) | 46 |

[1] Residence period in hours, 42.

EXAMPLE 3

Podosphaera test (powdery mildew of apples) [protective]

Solvent: 4.7 parts by weight acetone.
Emulsifier: 0.3 part by weight alkylaryl polyglycol ether.
Water: 95.0 parts by weight.

The amount of the particular active compound required for the desired concentration of such active compound in the spray liquid to be used is mixed with the stated amount of solvent, and the concentrate is diluted with the stated amount of water which contains the stated emulsifier.

Young apple seedlings in the 4–6 leaf stage are sprayed with the spray liquid until dripping wet. The plants remain in a greenhouse for 24 hours at 20° C. and at a relative atmospheric humidity of 70%. They are then inoculated by dusting with conidia of the apple powder mildew causative organism (*Podosphaera leucotricha* Salm.) and placed in a greenhouse at a temperature of 21–23° C. and at a relative atmospheric humidity of about 70%.

Ten days after the inoculation, the infestation of the seedlings is determined as a percentage of the untreated but also inoculated control plants.

0% means no infestation; 100% means that the infestation is exactly as great as in the case of the control plants.

The particular active compounds, the concentrations of such active compounds and the results obtained can be seen from the following Table 3:

TABLE 3.—PODOSPHAERA TEST [PROTECTIVE]

| Active compound | Infestation as a percentage of the infestation of the untreated control with a concentration of active compound in percent of — | |
|---|---|---|
| | 0.025 | 0.0062 |
| (A) N-trichloromethylthio-tetrahydrophthalimide (known) | 100 | 100 |
| (III$a_4$) | 12 | 71 |
| (II$a_3$) | 30 | |
| (XXIX$_4$) | 40 | 85 |
| (XXX$_4$) | 30 | 69 |
| (XXXIII$_3$) | 48 | |
| (XVII$_4$) | 39 | 64 |
| (LXIV$_3$) | 81 | |
| (XXII$_4$) | 36 | 55 |
| (LXV$_3$) | 20 | 49 |
| (LXVI$_3$) | 33 | |
| (XXV$_4$) | 17 | 78 |
| (LXVII$_3$) | 16 | 46 |

The following further examples and table of compounds illustrate, without limitation, a number of acyl-benzimidazolines usable in accordance with the present invention, including three different methods of preparing the same compound (cf. Examples 4 to 6).

EXAMPLE 4

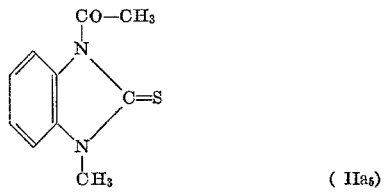

(II$a_6$)

16.4 g. 1-methyl-2-mercapto-benzimidazole are dissolved in 100 cc. dioxan. 11 g. triethylamine are added thereto, and then 8 g. acetyl chloride are added dropwise at 10–15° C. The reaction mixture is further stirred for 1½ hours at room temperature and then substantially freed from solvent by vacuum distillation. The residue is stirred together with 100 cc. water, filtered off with suction, washed with water and dried in a vacuum. Yield: 15 g. 1-acetyl-3-methyl-2-thiono-benzimidazoline which melts at 144° C. after recrystallization from white spirit.

EXAMPLE 5

(Same compound as in Examples 4 and 6, but differently prepared.)

41.6 g. of the sodium salt of 1-methyl-2-mercapto-benzimidazole are suspended in 200 cc. dioxan. 15.7 g. acetyl chloride are added dropwise thereto at 15–20° C., with cooling. The mixture is further stirred for half an hour at room temperature and 1 hour at 45–50° C. and then freed by filtration from the salt-like constituents. The filtrate is evaporated in a vacuum, the remaining residue is stirred together with water, filtered off with suction and dried. Yield: 36 g. 1-acetyl-3-methyl-2-thiono-benzimidazoline (III$a_6$), which after recrystallization from white spirit melts at 144° C.

EXAMPLE 6

(Same compound as in Examples 4 and 6, but differently prepared.)

16.4 g. of 1-methyl-2-mercapto-benzimidazole are introduced into a mixture of 80 cc. toluene and 15 g. acetic anhydride. The mixture is gradually heated to the boil, and boiled for 3 hours under reflux. The almost clear solution is filtered off from small amounts of impurities and cooled to 0° C. The crystals are filtered off with suction, washed with a little ice-cold toluene, and dried. There are obtained 16 g. of practically pure 1-acetyl-3-methyl-2-thiono-benzimidazoline (III$a_7$) of M.P. 155° C. By evaporation of the mother liquor, a further 3 g. of the same compound can be obtained.

In the corresponding manner there are obtained:

TABLE OF COMPOUNDS

| Active compound | Prepared in the same manner as in Ex. No. | Melting point, °C |
|---|---|---|
| (XIV₂) benzimidazol-2(3H)-one, 1-methyl-3-acetyl | 6 | 110–111 |
| (XV₂) benzimidazol-2(3H)-one, 1-acetyl-3-acetyl | 6 | 149–150 |
| (IIa₄) benzimidazol-2(3H)-thione, 1-H-3-acetyl | 4 | 155–156 |
| (LV₃) 5-methyl-benzimidazol-2(3H)-thione, 1-H-3-acetyl | 4 | 188–189 |
| (LVI₃) 4-methyl-benzimidazol-2(3H)-thione, 1-H-3-acetyl | 4 | 188–189 |
| (XXIX₅) benzimidazol-2(3H)-thione, 1-methyl-3-propionyl | 4 | 76 |
| (XXX₅) benzimidazol-2(3H)-thione, 1-methyl-3-butyryl | 4 | 88–89 |
| (XXXIV₂) benzimidazol-2(3H)-thione, 1-methyl-3-crotonoyl | 4 | 138–139 |
| (XXXIII₁) benzimidazol-2(3H)-thione, 1-methyl-3-methacryloyl | 4 | 138–140 |

TABLE OF COMPOUNDS—Continued

| Active compound | Prepared in the same manner as in Ex. No. | Melting point, °C |
|---|---|---|
| (IV₂) benzimidazol-2(3H)-thione, 1-methyl-3-formyl | (¹) | — |
| (XLIV₂) benzimidazol-2(3H)-thione, 1-methyl-3-phenacetyl | 4 | 148–149 |
| (XXXIX₂) benzimidazol-2(3H)-thione, 1-methyl-3-(methylthioacetyl) | 4 | 133–135 |
| (XXXVIII₂) benzimidazol-2(3H)-thione, 1-methyl-3-(ethoxyacetyl) | 4 | — |
| (LVII₁) benzimidazol-2(3H)-thione, 1-ethyl-3-acetyl | 4 | 87–88 |
| (LVIII₁) benzimidazol-2(3H)-thione, 1-ethyl-3-propionyl | 4 | 75–76 |
| (LIX₁) benzimidazol-2(3H)-thione, 1-propyl-3-acetyl | 4 | 83–84 |
| (LX₁) benzimidazol-2(3H)-thione, 1-propyl-3-propionyl | 4 | 78–79 |
| (V₂) benzimidazol-2(3H)-thione, 1-isopropyl-3-acetyl | 4 | 103–104 |

¹ By heating with formic acid or methyl formate.

TABLE OF COMPOUNDS—Continued

| Active compound | Prepared in the same manner as in Ex. No. | Melting point, °C. |
|---|---|---|
| (LXI₁) — benzimidazole-2-thione, N-CH(CH₃)₂, N-CO-C₂H₅ | 4 | 63–64 |
| (LXII₁) — benzimidazole-2-thione, N-C₄H₉, N-CO-CH₃ | 4 | 85–86 |
| (LXIII₁) — benzimidazole-2-thione, N-C₄H₉, N-CO-C₂H₅ | 4 | 72–73 |
| (XVII₅) — benzimidazole-2-thione, N-CH₃, 5-Cl, N-CO-CH₃ | 4 | 144–145 |
| (LXIV₄) — benzimidazole-2-thione, N-CH₃, 4-Cl, N-CO-C₂H₅ | 4 | 104–105 |
| (XXII₅) — benzimidazole-2-thione, N-CH₃, H₃C-, N-CO-CH₃ | 6 | 127–128 |
| (LXV₄) — benzimidazole-2-thione, N-CH₃, H₃C-, N-CO-C₂H₅ | 4 | 91–92 |
| (LXVI₄) — benzimidazole-2-thione, N-CH₃, CH₃O-, N-CO-C₂H₅ | 4 | 118–119 |
| (XXV₅) — benzimidazole-2-thione, N-CH₃, CF₃-, N-CO-CH₃ | 4 | 110–111 |

TABLE OF COMPOUNDS—Continued

| Active compound | Prepared in the same manner as in Ex. No. | Melting point, °C. |
|---|---|---|
| (LXVII₄) — benzimidazole-2-thione, N-CH₃, CF₃-, N-CO-C₂H₅ | 4 | 138–139 |
| (XI₂) — benzimidazole-2-thione, N-cyclohexyl, N-CO-CH₃ | 6 | 126–127 |
| (LXVIII₁) — benzimidazole-2-thione, N-cyclohexyl, N-CO-C₂H₅ | 6 | 113–115 |
| (VIII₂) — benzimidazole-2-thione, N-(CH₂)₃-OCH₃, N-CO-CH₃ | 6 | 79–80 |
| (LXIX₁) — benzimidazole-2-thione, N-(CH₂)₃-OCH₃, N-CO-C₂H₅ | 6 | 73–75 |
| (VII₂) — benzimidazole-2-thione, N-CH₂-CH=CH₂, N-CO-CH₃ | 6 | 80–28 |
| (LXX₁) — benzimidazole-2-thione, N-CH₂-CH=CH₂, N-CO-C₂H₅ | 6 | 67–69 |
| (VI₂) — benzimidazole-2-thione, N-C₁₂H₂₅, N-CO-CH₃ | 6 | 66–67 |

TABLE OF COMPOUNDS—Continued

| Active Compound | Prepared in the same manner as in Ex. No. | Melting point, °C. |
|---|---|---|
| (LXXI₁) benzimidazole with N-C₁₂H₂₅, C=S, N-CO-C₂H₅ | 6 | 55–56 |
| (LXXII₁) benzimidazole with N-CH₂-phenyl, C=S, N-CO-CH₃ | 6 | 151–153 |
| (LXXIII₁) benzimidazole with N-CH₂-phenyl, C=S, N-CO-C₂H₅ | 6 | 99–100 |
| (XXVIII₂) benzimidazole with N-CH₃, CH₃S-, C=S, N-CO-CH₃ | 6 | 145–147 |
| (LXXIV₁) benzimidazole with N-CH₃, CH₃S-, C=S, N-CO-C₂H₅ | 6 | 126–128 |

EXAMPLE 7

Using corresponding molar amounts of each of the following 2-mercapto or 2-hydroxy benzimidazoles with each of the following acid chlorides, respectively, in accordance with the general procedure of Example 4, as the case may be:

(a) 1 - hex - 5-enyl-2-mercapto-6-nitro-benzimidazole and 2-chloro-2-fluoro-3-bromo-n-butanoyl chloride;

(b) 1 - (1' - methyl - vinyl)-2-hydroxy-4-iodo-5-fluoro-6-chlorobenzimidazole and iodoacetyl chloride;

(c) 1 - n - butanoyl-2-hydroxy-5-dibromomethyl-6-nitro-7-bromobenzimidazole and 2-(2'-pyridyl)-n-propanoyl chloride;

(d) 1 - (4'-tert.-butoxy-n-butyl)-2-mercapto-5-(1'-bromo-2'-chloro-ethyl)-6-iodomethyl-benzimidazole and 3-(N-pyrrolidyl)-n-butanoyl chloride;

(e) 1 - n - octyl - 2-mercapto-4-(1',1'-dibromo-2'-chloro-3' - fluoro-n-propyl)-5-n-propoxy-6-tert.-butyl-7-bromo-benzimidazole and 2 - (3' - bromo-4'-fluoro-5'-chloro-phenyl)-n-propanoyl chloride;

(f) 1 - (2' - n - propoxy-ethyl)-2-hydroxy-5-ethoxy-6-sec.-butyl-mercapto-benzimidazole and 3-(3'-chloro-4'-iodo-5'-cyano-phenyl)-n-butanoyl chloride;

(g) 1 - sec. - butylmercapto-n-butyl-2-hydroxy-benzimidazole and 2-(3'-bromo-4'-nitro-5'-isopropyl-phenyl)-n-propanoyl chloride;

(h) 1 - (3' - phenyl - n - propyl)-2-hydroxy-benzimidazole and 3-(2'-pyridyl)-crotonyl chloride; and (i) 1 - n - propanoyl-2-mercapto-benzimidazole and 2-(β-thienyl)-acrylyl chloride;

the corresponding final products are produced:

(a') 1 - (2' - chloro - 2' - fluoro-3'-bromo-n-butanoyl)-2-thiono-3-hex-5-enyl-5-nitro-benzimidazoline;

(b') 1 - iodoacetyl - 2 - oxo-3-(1'-methyl-vinyl)-5-chloro-6-fluoro-7-iodo-benzimidazoline;

(c') 1 - (2' - [2'' - pyridyl] - n - propanoyl) - 2 - oxo-3-n-butanoyl - 4-bromo-5-nitro-6-dibromomethyl-benzimidazoline;

(d') 1 - (3' - [N-pyrrolidyl]-n-butanoyl)-2-thiono-3-(4''-tert. - butoxy - n - butyl) - 5-iodomethyl-6-(1'''-bromo-2'''-chloro-ethyl)-benzimidazoline;

(e') 1 - (2' - [3'' - bromo-4''-fluoro-5''-chloro-phenyl]-n-propanoyl) - 2-thiono-3-n-octyl-4-bromo-5-tert.-butyl-6-n - propoxy - 7-(1''',1'''-dibromo-2'''-chloro-3'''-fluoro-n-propyl)-benzimidazoline;

(f') 1 - (3' - [3'' - chloro - 4'' - iodo-5''-cyano-phenyl]-n-butanoyl) - 2 - oxo - 3 - (2''' - n-propoxy-ethyl)-5-sec.-butylmercapto-6-ethoxy-benzimidazoline;

(g') 1 - (2' - [3''-bromo-4''-nitro-5''-isopropyl-phenyl]-n-propanoyl) - 2 - oxo-3-sec.-butylmercapto-n-butyl-benzimidazoline;

(h') 1 - (3' - [2'' - pyridyl] - crotonyl) - 2 - oxo - 3 - (3'''-phenyl-n-propyl)-benzimidazoline; and (i') 1 - (2' - [β-thienyl]-acrylyl)-2-thiono-3-n-propanoyl-benzimidazoline.

Advantageously, in accordance with the present invention, in the foregoing formulae:

R represents hydrogen; alkyl having 1–12 carbon atoms, including straight and branched chains, such as methyl, ethyl, n-propyl, isopropyl, n-butyl, isobutyl, sec.-butyl, tert.-butyl, amyl, isoamyl, hexyl, isohexyl, heptyl, octyl, nonyl, decyl, undecyl, dodecyl, and the like, especially lower alkyl, and particularly $C_{1-4}$ alkyl; alkenyl having 2–6 carbon atoms, including straight and branched chains, such as vinyl, α-allyl (i.e., prop-2-enyl), β-allyl (i.e., 1-methyl vinyl), γ-allyl (i.e., prop-1-enyl), but-1-enyl, but-2-enyl (i.e., crotyl), but-3-enyl, methallyl (i.e., 2-methyl-prop-2-enyl), isobutenyl (i.e., 2-methyl-prop-1-enyl), pentenyl, hexenyl, and the like, especially lower alkenyl, and particularly $C_{2-4}$ alkenyl; substituted lower alkyl which is substituted with lower alkoxy such as methoxy, ethoxy, n-propoxy, isopropoxy, n-butoxy, isobutoxy, sec.-butoxy, tert.-butoxy, and the like, or with lower alkylmercapto such as methyl- to tert.-butyl inclusive-mercapto, and the like, or with phenyl, i.e., especially $C_{1-4}$ alkoxy-$C_{1-4}$ alkyl, $C_{1-4}$ alkylmercapto-$C_{1-4}$ alkyl and phenyl-$C_{1-4}$ alkyl; cycloalkyl having 5–8, especially 5–6, ring carbon atoms, such as cyclo- -pentyl, -hexyl, -heptyl, -octyl, and the like; or lower alkanoyl, such as acetyl, propanoyl, butanoyl, α-methyl-propanoyl, pentanoyl, β-methyl-butanoyl, α-methyl butanoyl, α,α-dimethyl acetyl, and the like, especially $C_{1-4}$ or $C_{1-3}$ alkanoyl, i.e., —CO—$C_{1-4}$ alkyl or —CO—$C_{1-3}$ alkyl.

R represents hydrogen; alkyl having 1–17 carbon atoms including straight and branched chains, such as methyl to heptadecyl inclusive, especially lower alkyl, and particularly $C_{1-6}$ or $C_{1-4}$ alkyl; alkenyl having 2–4 carbon atoms, such as vinyl to butenyl inclusive, as noted above, and the like; alkynyl having 2–4 carbon atoms, such as acetylene, propynyl, butynyl, and the like; substituted lower alkyl which is substituted with halo, such as chloro, bromo, fluoro and iodo, especially 1–3 chloro, bromo or fluoro, and particularly tri-halo-$C_{1-4}$-alkyl, or with lower alkoxy, such as methoxy to tert.-butoxy inclusive as noted above, and the like, especially $C_{1-4}$ alkoxy-$C_{1-4}$ alkyl, or with $C_{1-12}$ alkylmercapto, such as methyl to dodecyl inclusive mercapto, and the like, especially lower alkylmercapto-$C_{1-4}$ alkyl, and particularly $C_{1-4}$ alkylmercapto-$C_{1-4}$ alkyl, or with phenyl lower alkylmercapto such as benzyl-, phenylethyl-, phenylpropyl-, phenylbutyl- -mercapto, and the like, especially phenyl-$C_{1-4}$ or $C_{1-2}$ alkylmercapto-$C_{1-4}$ alkyl, or with phenoxy, and especially phenoxy-$C_{1-4}$ alkyl, or with phenylmercapto, and especially phenylmercapto-$C_{1-4}$ alkyl, or with heterocyclic having 5–6 ring members and a hetero linking atom such as nitrogen, oxygen or sulfur, especially pyridyl-, pyrrolidyl-, thienyl-, furyl-, and the like, -$C_{1-4}$ lower alkyl, or with phenyl, or with substituted phenyl which is mono, di and mixed substituted with halo as noted above, especially chloro, $C_{1-4}$ alkyl, as noted above, nitro, $C_{1-4}$ alkoxy as noted above, or cyano; phenyl-$C_{2-4}$ alkenyl such as phenyl substituted vinyl to butenyl inclusive, and the like, as noted above; heterocyclic-$C_{2-4}$ alkenyl, having 5–6 ring members and a hetero linking atom such as nitrogen, oxygen or sulfur in the heterocyclic moiety, especially pyridyl-, pyrrolidyl-, thienyl-, furyl-, etc., substituted vinyl to butenyl inclusive, and the like; and cycloalkyl having 3–6 ring carbon atoms such as cyclopropyl, butyl, pentyl, hexyl, and the like, especially $C_{5-6}$ cycloalkyl.

X represents sulfur or oxygen;

Y represents halo, as noted above; $C_{1-4}$ alkyl, as noted above; $C_{1-4}$ alkoxy, as noted above; $C_{1-4}$ alkylmercapto, as noted above; nitro; and halo $C_{1-4}$ alkyl, such as chloro, bromo, iodo or fluoro substituted methyl to tert.-butyl inclusive, especially halo-$C_{1-2}$ alkyl, and particularly trifluoromethyl; and $n$ is a number from 0 to 4, especially 0 to 2.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used, while having correspondingly favorable compatibility with warm-blooded creatures and plants, for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. Fungicidal composition which consists essentially of a mixture of a dispersible carrier vehicle selected from the group consisting of (1) a finely divided dispersible carrier solid and (2) a dispersible carrier liquid containing a surface-active agent and a fungicidally effective amount, constituting substantially between about 0.0001–95% by weight of the mixture, of a 1-acylbenzimidazoline compound of the formula

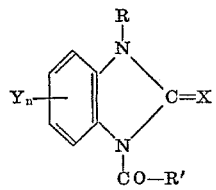

in which R is selected from the group consisting of hydrogen, alkyl of 1–12 carbon atoms, alkenyl of 2–6 carbon atoms, $C_{1-4}$ alkoxy-$C_{1-4}$ alkyl, $C_{1-4}$ alkylmercapto-$C_{1-4}$ alkyl, phenyl-$C_{1-4}$ alkyl, cycloalkyl of 5–8 ring carbon atoms, and $C_{1-4}$ alkanoyl, R' is selected from the group consisting of hydrogen, alkyl of 1–17 carbon atoms, alkenyl of 2–4 carbon atoms, alkynyl of 2–4 carbon atoms, halo-$C_{1-4}$ alkyl, $C_{1-4}$ alkoxy-$C_{1-4}$ alkyl, $C_{1-12}$ alkylmercapto-$C_{1-4}$ alkyl, phenyl-$C_{1-4}$ alkylmercapto-$C_{1-4}$ alkyl, phenoxy-$C_{1-4}$ alkyl, phenylmercapto-$C_{1-4}$ alkyl, heterocyclic-$C_{1-4}$ alkyl of 5–6 ring members and a hetero atom selected from the group consisting of N, O and S in such corresponding heterocyclic moiety, phenyl-$C_{1-4}$ alkyl, substituted phenyl-$C_{1-4}$ alkyl in which such phenyl moiety is substituted with 1–2 substituents selected from the group consisting of halo, $C_{1-4}$ alkyl, nitro, $C_{1-4}$ alkoxy, cyano, and mixtures of such substituents, phenyl $C_{2-4}$ alkenyl, heterocyclic-$C_{2-4}$ alkenyl of 5–6 ring members and a hetero atom selected from the group consisting of N, O and S in such corresponding heterocyclic moiety, and cycloalkyl of 3–6 carbon atoms, X is selected from the group consisting of sulfur and oxygen, each Y respectively is selected from the group consisting of halo, $C_{1-4}$ alkyl, $C_{1-4}$ alkoxy, $C_{1-4}$ alkylmercapto, halo $C_{1-4}$ alkyl in which such alkyl moiety is substituted with 1–3 halo substituents, and nitro, and $n$ is a number from 0 to 4.

2. Composition of claim 1 wherein R is selected from the group consisting of hydrogen, alkyl of 1–12 carbon atoms, alkenyl of 2–4 carbon atoms, $C_{1-4}$ alkoxy-$C_{1-4}$ alkyl, phenyl-$C_{1-4}$ alkyl, $C_{5-6}$ cycloalkyl, and $C_{1-4}$ alkanoyl, R' is selected from the group consisting of hydrogen, $C_{1-4}$ alkyl, alkenyl of 2–4 carbon atoms, $C_{1-4}$ alkoxy-$C_{1-4}$ alkyl, $C_{1-4}$ alkylmercapto-$C_{1-4}$ alkyl, and phenyl-$C_{1-4}$ alkyl, X is selected from the group consisting of sulfur and oxygen, Y is selected from the group consisting of halo, $C_{1-4}$ alkyl, $C_{1-4}$ alkoxy, $C_{1-4}$ alkylmercapto, and halo $C_{1-4}$ alkyl in which such alkyl moiety is substituted with 1–3 halo substituents, and $n$ is 0 to 1.

3. Composition of claim 1 wherein R is selected from the group consisting of hydrogen and $C_{1-4}$ alkyl, R' is selected from the group consisting of alkyl of 1–4 carbon atoms, and alkenyl of 2–4 carbon atoms, X is sulfur, Y is selected from the group consisting of chloro, $C_{1-4}$ alkyl, $C_{1-4}$ alkoxy, and trifluoromethyl, and $n$ is 0 to 1.

4. Composition of claim 1 wherein the 1-acyl-benzimidazoline compound is 1-acetyl-2-thiono-benzimidazoline having the formula

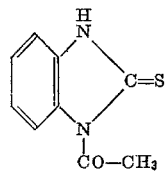

5. Composition of claim 1 wherein the 1-acyl-benzimidazoline compound is 1-acetyl-3-methyl-2-thiono-benzimidazoline having the formula

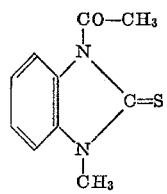

6. Composition of claim 1 wherein the 1-acyl-benzimidazoline compound is 1-acetyl-5-methyl-2-thiono-benzimidazoline having the formula

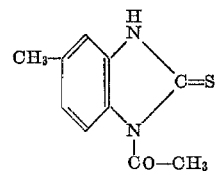

7. Composition of claim 1 wherein the 1-acyl-benzimidazoline compound is 1-propanoyl-3-methyl-2-thiono-benzimidazoline having the formula

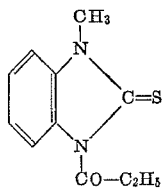

8. Composition of claim 1 wherein the 1-acyl-benzimidazoline compound is 1-methacryl-3-methyl-2-thiono-benzimidazoline having the formula

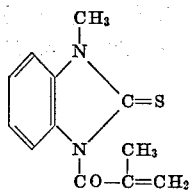

9. Composition of claim 1 wherein the 1-acyl-benzimidazoline compound is 1-acetyl-3-methyl-6-chloro-benzimidazoline having the formula

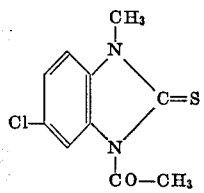

10. Composition of claim 1 wherein the 1-acyl-benzimidazoline compound is 1,3-diacetyl-2-oxo-benzimidazoline having the formula

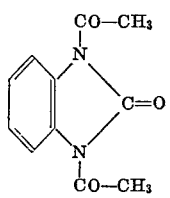

11. Composition according to claim 1 wherein the 1-acyl-benzimidazoline compound is in the form of a mixture with said finely divided dispersible carrier solid containing said surface-active agent, said compound being present in a fungicidally effective amount and constituting substantially between about 0.0001–1% by weight of the mixture.

12. Composition of claim 1 wherein the 1-acyl-benzimidazoline compound is 1-butyryl-3-methyl-2-thiono-benzimidazoline of the formula

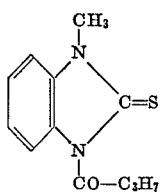

13. Composition of claim 1 wherein the 1-acyl-benzimidazoline compound is 1-acetyl-3-butyl-2-thiono-benzimidazoline of the formula $$\text{structure with } C_4H_9, C=S, CO-CH_3$$

14. Composition of claim 1 wherein the 1-acyl-benzimidazoline compound is 1-acetyl-3,6-dimethyl-2-thiono-benzimidazoline of the formula $$\text{structure with } CH_3, CH_3, C=S, CO-CH_3$$

15. Composition of claim 1 wherein the 1-acyl-benzimidazoline compound is 1-propionyl-3-($\gamma$-methoxypropyl)-2-thiono-benzimidazoline of the formula

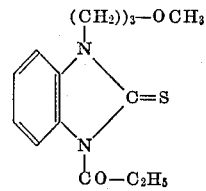

16. Method of combatting fungi, which comprises applying to at least one of (a) such fungi and (b) their habitat, a fungicidally effective amount of the 1-acyl-benzimidazoline compound of claim 1.

17. Method of claim 16 wherein the 1-acyl-benzimidazoline compound is used in the form of a mixture with a dispersible carrier vehicle, said compound being present in a fungicidally effective amount and constituting substantially between about 0.0001–1% by weight of the mixture.

18. Method of claim 16 wherein R is selected from the group consisting of hydrogen, alkyl of 1–12 carbon atoms, alkenyl of 2–4 carbon atoms, $C_{1-4}$ alkyl, phenyl-$C_{1-4}$ alkyl, $C_{5-6}$ cycloalkyl, and $C_{1-4}$ alkanoyl, R' is selected from the group consisting of hydrogen, $C_{1-4}$ alkyl, alkenyl of 2–4 carbon atoms, $C_{1-4}$ alkoxy-$C_{1-4}$ alkyl, $C_{1-4}$ alkylmercapto-$C_{1-4}$ alkyl, and phenyl-$C_{1-4}$ alkyl, X is selected from the group consisting of sulfur and oxygen, Y is selected from the group consisting of halo, $C_{1-4}$ alkyl, $C_{1-4}$ alkoxy, $C_{1-4}$ alkylmercapto, and halo $C_{1-4}$ alkyl in which such alkyl moiety is substituted with 1–3 halo substituents, and $n$ is 0 to 1.

19. Method of claim 16 wherein R is selected from the group consisting of hydrogen and $C_{1-4}$ alkyl, R' is selected from the group consisting of alkyl of 1–4 carbon atoms, and alkenyl of 2–4 carbon atoms, X is sulfur, Y is selected from the group consisting of chloro, $C_{1-4}$ alkyl, $C_{1-4}$ alkoxy, and trifluoromethyl, and $n$ is 0 to 1.

20. Method of claim 16 wherein the 1-acyl-benzimidazoline compound is 1-acetyl-2-thiono-benzimidazoline.

21. Method of claim 16 wherein the 1-acyl-benzimidazoline compound is 1-acetyl-3-methyl-2-thiono-benzimidazoline.

22. Method of claim 16 wherein the 1-acyl-benzimidazoline compound is 1-acetyl-5-methyl-2-thiono-benzimidazoline.

23. Method of claim 16 wherein the 1-acyl-benzimidazoline compound is 1-propanoyl-3-methyl-2-thiono-benzimidazoline.

24. Method of claim 16 wherein the 1-acyl-benzimidazoline is 1-methacryl-3-methyl-2-thiono-benzimidazoline.

25. Method of claim 16 wherein the 1-acyl-benzimidazoline compound is 1-acetyl-3-methyl-6-chloro-benzimidazoline.

26. Method of claim 16 wherein the 1-acyl-benzimidazoline compound is 1,3-diacetyl-2-oxo-benzimidazoline.

27. Method of claim 16 wherein the 1-acyl-benzimidazoline compound is 1-butyryl-3-methyl-2-thiono-benzimidazoline.

28. Method of claim 16 wherein the 1-acyl-benzimidazoline compound is 1-acetyl-3-butyl-2-thiono-benzimidazoline.

29. Method of claim 16 wherein the 1-acyl-benzimidazoline compound is 1-acetyl-3,6-dimethyl-2-thiono-benzimidazoline.

30. Method of claim 16 wherein the 1-acyl-benzimidazoline compound is 1-propionyl-3-($\gamma$-methoxypropyl)-2-thiono-benzimidazoline.

(References on following page)

References Cited

UNITED STATES PATENTS 3,345,377 10/1967 Goliasch et al. ____ 260—309.2
3,369,027 2/1968 Klauke et al. _____ 260—309.2

OTHER REFERENCES

Chemical Abstracts, vol. 67, 1967.
Chemical Abstracts, vol. 54, 9896–9898 (1960); vol. 60, 10689–10690 (1964); vol. 59, 2799–2800 (1963).

FRANK CACCIAPAGLIA, Jr., Primary Examiner
FREDERICK E. WADDELL, Assistant Examiner U.S. Cl. X.R.

260—309.2; 424—263, 273, 274, 275, 278, 285, 304, 335